(No Model.)

J. H. PIERCE & A. J. DICKSON.
PNEUMATIC TIRE.

No. 520,536. Patented May 29, 1894.

Witnesses
C. A. Ford
W. S. Duvall

Inventors
Jos. H. Pierce,
Amos J. Dickson,
By their Attorneys.
C. A. Snow & Co.

UNITED STATES PATENT OFFICE.

JOSEPH H. PIERCE AND AMOS J. DICKSON, OF GLENWOOD SPRINGS, COLORADO.

PNEUMATIC TIRE.

SPECIFICATION forming part of Letters Patent No. 520,536, dated May 29, 1894.

Application filed October 6, 1893. Serial No. 487,377. (No model.)

*To all whom it may concern:*

Be it known that we, JOSEPH H. PIERCE and AMOS J. DICKSON, citizens of the United States, residing at Glenwood Springs, in the county of Garfield and State of Colorado, have invented a new and useful Pneumatic Tire, of which the following is a specification.

Our invention relates to pneumatic-tires, the objects in view being to provide a tire primarily designed for use on bicycles, but also capable of use on sulkies, buggies, or in fact any wheel wherein elasticity and lightness are necessary; to provide for a ready temporary repair of the tire should the same become punctured and obviate in such case the escape of such an amount of air as would cause a collapsing of the tire.

Various other objects and advantages of the invention will appear in the following description and the novel features thereof will be particularly pointed out in the claims.

Figure 1:
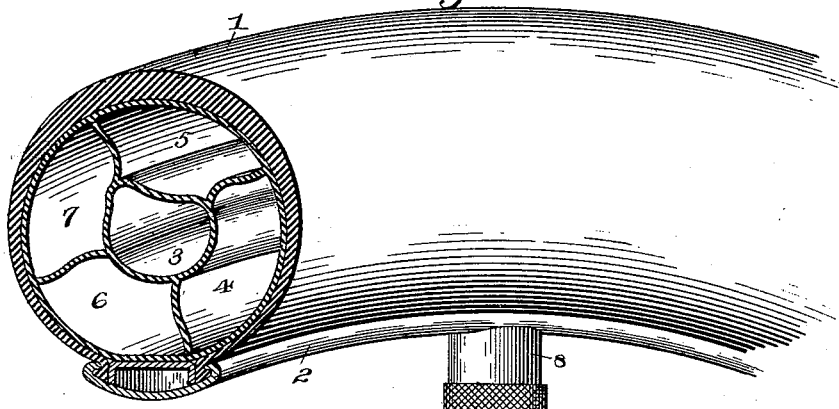
Figure 3:
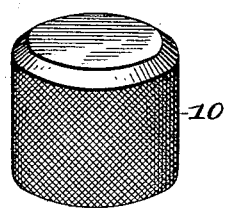
Figure 2:
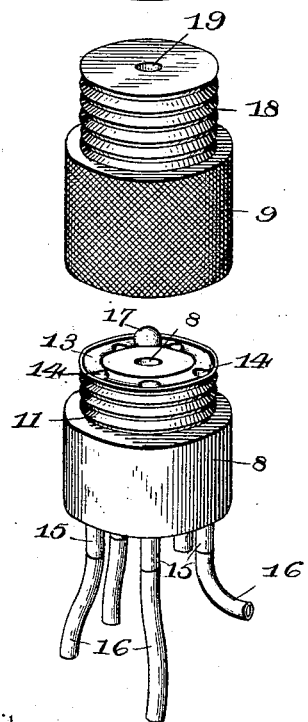
Figure 2:
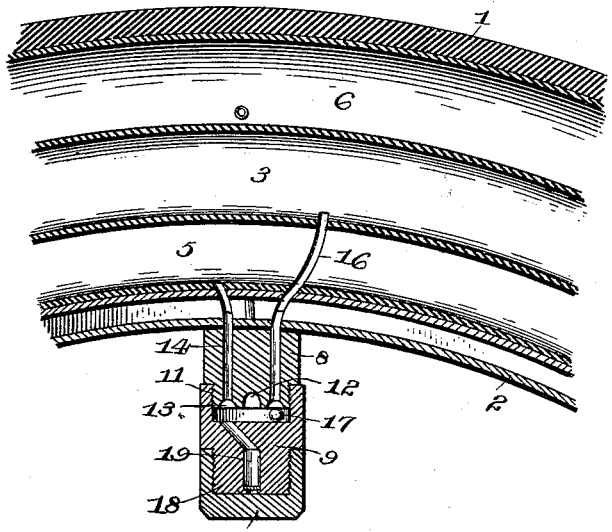
Figure 4:

Referring to the drawings:—Figure 1 is a transverse sectional view of a portion of a tire embodying our invention. Fig. 2 is a longitudinal sectional view through the inflating valve. Fig. 3 represents details in perspective of the three members composing the valve. Fig. 4 is a view of plug.

Like numerals of reference indicate like parts in all the figures of the drawings.

It will be understood that any ordinary rim and external jacket or tube may be employed in connection with the hereinafter described invention. In the present instance we have illustrated an external tube or jacket 1 connected to the rim 2, which latter is of the "clincher" form. The interior of the tube or jacket 1 receives a series of internal tubes preferably integrally formed, designated as 3, 4, 5, 6 and 7, the same being of rubber and readily inflatable. Each tube is capable of being expanded to an extent to fill the external tube 1, though they are not normally so expanded. The inflating valve comprises three members, which we will designate as the plug-member 8, the pump member 9, and the cap 10. The plug member is seated in a hole formed in the rim for its accommodation, and adjacent to its upper end is externally threaded as indicated at 11 to receive the lower end of the pump-member 9, which it will be understood has its lower end recessed and internally threaded for the purpose. The depth of the recess in the lower end of the member 9 and of the threaded portion of the upper end of the member 8 are relatively speaking such as to produce a space between the bottom of the member 9 and the upper end of the plug member 8. The upper end of the member 8 is provided with a central pocket or depression 12, and the same is surrounded by a channel or groove 13. The plug-member is further provided with a series of, in this instance, three perforations 14, said perforations agreeing in number with the internal inflatable tubes of the tire. Metal tubes 15 are seated in the perforations of the common valve and are connected at their inner ends by means of rubber tubes 16, each with one of the internal inflatable tubes of the tire. Located in the groove or channel 13 of the plug member 8 is a ball 17 of rubber, cork, or other suitable material, the same being free to move or roll about in the channel. The pump-member 9 has its upper end provided with a reduced externally threaded portion 18, and is also at said end provided with a valved bore 19, which toward its lower end is deflected, as indicated, so as to communicate with the plug-member 8 at about the channel 13. The cap member 10, as its name indicates, is simply a cap for fitting over and closing the upper end of the pump-member 9 when the air-pump, not shown, is disconnected therefrom.

In order to fill the tire or expand the same to its normal condition, the cap 10 is removed and an ordinary air-pump coupled to the threaded end 18 of the pump-member 9, and said pump operated so as to force air through the bore 19 and through the several perforations 14, through the tubes 15 and 16 into their respective inflating-tubes 3, 4, 5, 6 and 7. The rubber ball during this operation is placed in the cavity 12, which is about the same depth as the groove or channel 13, and hence cannot get over any of the perforations in the plug-member. After the tire has been expanded to its normal condition, the wheel is revolved so that the ball 17 is dropped from the cavity 12 into the channel 13, after which the pump is removed and the cap 10 placed in position to close the bore 19 of the pump-member. The tire is now ready for use, and it will be seen that it contains all the elastic qualities of the well known pneumatic-tire. If at any time a puncture should occur, as for instance, the tube 5 should become punctured, the air escaping from said puncture will cause a suction in the channel 13 which will draw the ball 17 which operates as an automatic check over the perforation which is connected with the punctured inflating-tube and thus the perforation be closed and also indicated upon an inspection of the plug member, permissible by a removal of the pump member 9 therefrom. When located, a plug 20, any number of which may be conveniently carried in a tool-bag of the machine, is inserted in the perforation that communicates with the punctured member, the ball being removed and placed in the cavity 17 as before, the pump-member 9 replaced upon the plug member and coupled with the pump, and the operation of pumping carried on, the remaining tubes 3, 4, 6 and 7 being inflated to such an extent as to completely fill the external jacket or tube 1 and thus take the place of the punctured tube 5. Thus it will be seen that a most efficient repair is made in an extremely short time, and with but little labor, requiring no ingenuity whatever. It will be observed that as long as one inner tube remains without puncture the tire is capable of immediate repair, in that the remaining tubes collapsing, this one tube may be expanded until it fills the outer jacket or tube 1.

From the foregoing description, in connection with the accompanying drawings, it will be seen that a rider need carry but the ordinary pump that accompanies all pneumatic-tires, and can accomplish any repair necessary with little labor, without the aid of tools, and in a short period of time.

Various changes in the details of our invention will readily suggest themselves, and we do not limit our invention to those details herein shown and described, but hold that we may make such variations therein as we deem necessary to the successful practice of our invention. For instance, the number of tubes within the main tube 1 may be changed as desired, it being simply necessary that there be a plurality or more than one, and that each tube be capable of expanding to such a degree as to completely fill the inner tube 1; or we may rely upon two or more tubes to take the place of one tube that may be punctured. We may also change the construction of valve, though we deem the one herein shown as especially designed for use in connection with our invention.

Having described our invention, what we claim is—

1. A pneumatic tire, comprising a flexible external covering or tube, a plurality of separate integrally formed expansible tubes arranged within the external covering or tube, and a common valve plug provided with separate channels and communicating with each of the expansible tubes and having an automatic check valve arranged to close any one of the channels, substantially as described.

2. In a pneumatic tire, the combination with the external tube, the plurality of independently expansible tubes, a less number than all of which is capable of expanding to fill the external tube, of a rim, a valve-plug seated in the rim having perforations, feed-tubes leading from the perforations to each of the expanding tubes, said perforations terminating at a common point or chamber, and a loose ball located in the chamber and adapted to close any one of said perforations, substantially as specified.

3. In a pneumatic tire, the combination with the external tube, the plurality of independent non-communicating expanding tubes, a less number than all of which is capable of expanding to completely fill the external tube, of a rim, a valve-plug seated in the rim and provided with perforations, feed-tubes leading from the perforations to each of the expanding tubes, means for closing any one or more of the perforations and for connecting a pump with said valve-plug, substantially as specified.

4. In a pneumatic tire, the combination with an external tube, a series of internal expanding tubes, a less number than the whole of which is capable of being expanded to fill the external tube, and a rim, of a plug let into the rim and having an outer threaded end, an annular channel, and a series of perforations in said channel, tubes leading from the perforations to the expanding tubes, a ball loosely mounted in the channel, a cylindrical member threaded on the plug and having a valved bore leading to the channel and at its outer end adapted to engage with the pump, and a cap arranged removably on said threaded end, substantially as specified.

5. In a pneumatic tire, the combination with an external tube, a series of internal expanding tubes, a less number than the whole of which is capable of being expanded to fill the external tube, and a rim, of a plug let into the rim and having an outer threaded end, an annular channel, a concentric cavity, and a series of perforations in said channel, tubes leading from the perforations to the expanding tubes, a ball loosely mounted in the channel, a cylindrical member threaded on the plug and having a valved bore leading to the channel and at its outer end adapted to engage with the pump, and a cap arranged removably on said threaded end, substantially as specified.

In testimony that we claim the foregoing as our own we have hereto affixed our signatures in the presence of two witnesses.

JOSEPH H. PIERCE.
AMOS J. DICKSON.

Witnesses:
WM. VAN GUNDY,
JOHN L. NOONAN.